Nov. 19, 1940.  C. B. MOORE  2,221,950
COMPENSATING INSTRUMENT
Filed April 9, 1938
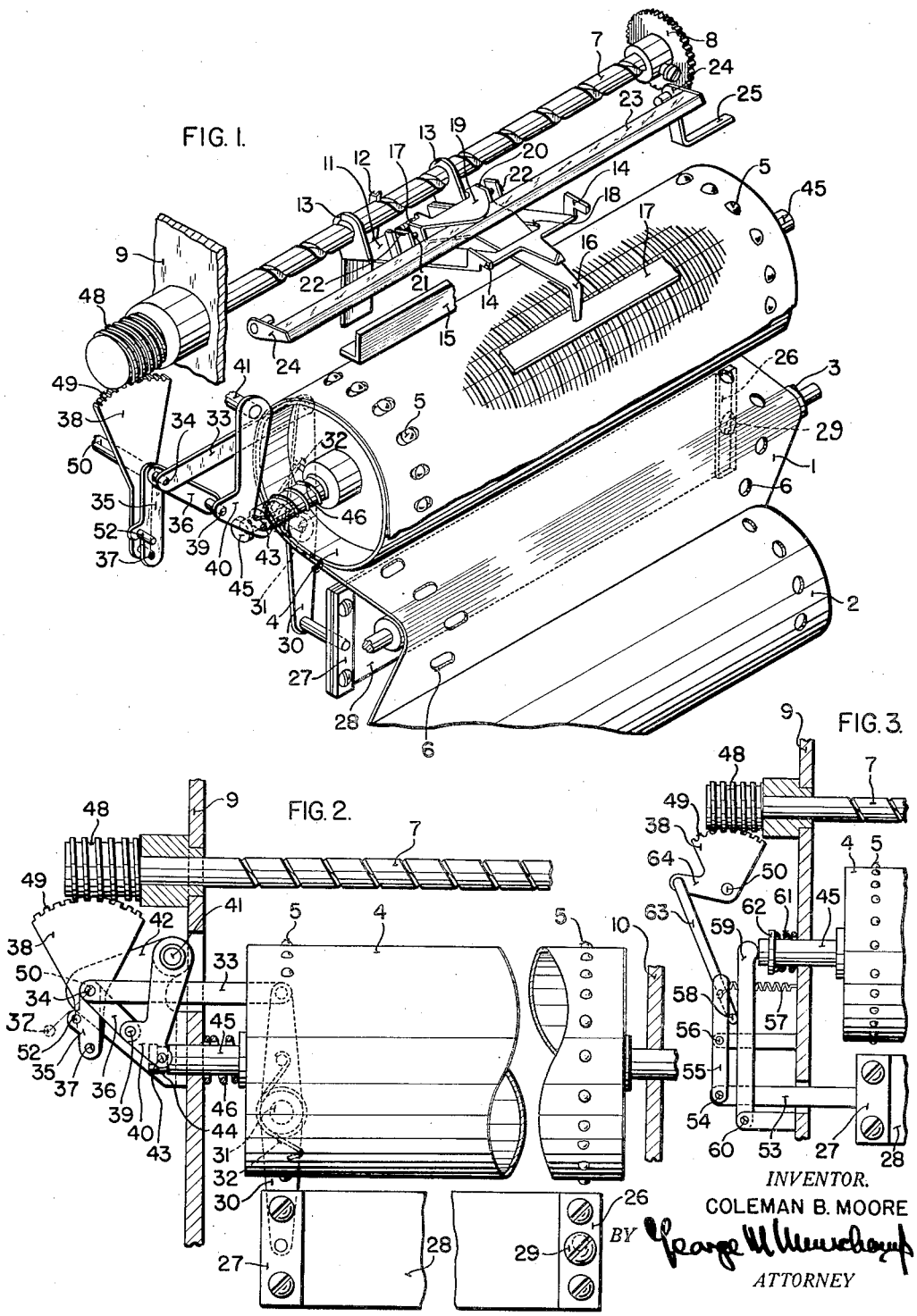
INVENTOR.
COLEMAN B. MOORE
BY George M. Merchant
ATTORNEY Patented Nov. 19, 1940

2,221,950

UNITED STATES PATENT OFFICE 2,221,950

COMPENSATING INSTRUMENT

Coleman E. Moore, Carroll Park, Pa., assignor to The Brown Instrument Company, Philadelphia, Pa., a corporation of Pennsylvania Application April 9, 1938, Serial No. 201,103

7 Claims. (Cl. 234—71)

My present invention relates to measuring instruments, particularly precision measuring instruments in which a pointer or marking device moves over an exhibiting surface such as a graduated scale or chart, thus indicating or recording the magnitude of a quantity or condition being measured by the instrument. The operating mechanism of such instruments has been developed to a high degree of mechanical and electrical efficiency and accuracy for normal operating conditions. While the mechanism for measuring the quantity values and transmitting them to an exhibiting mechanism is highly accurate, the exhibiting surface upon which said values are recorded or indicated varies in size due to changes in the humidity of the atmosphere to which the surface is subjected.

In recording instruments utilizing a traveling strip chart, the expansion or contraction of the width of the chart with humidity has been recognized and permitted by mounting the chart on a driving roll with one side of the chart fixed relative to the roll and the opposite side movable relative thereto. This arrangement provides a smooth surface of the chart since one end of the chart may then move relative to its driving roll to prevent buckling thereof, but the quantity values recorded thereon are accurate only under humidity conditions equal to those at which the chart was printed. It will therefore be seen that in charts of a certain initial width, the error in the measurement recorded will vary as the width of the chart changes due to changes in humidity of the atmosphere to which it is subjected. The error will also vary depending upon the distance the exhibiting element is from the fixed side of the chart. While the error is small, it is a relatively significant one.

The object of my invention is to provide a simple and accurate mechanism that automatically shifts the driving roll for the exhibiting chart in an axial direction with changes in the humidity to which the chart is subjected, so that at all times the correct portion of the chart is under the exhibiting element. In this manner, any ambient conditions are compensated for without any disturbance or adjustment of any of the measuring mechanism. My present compensating mechanism can easily be attached to existing instruments of this type and may readily be incorporated in instruments as they are being built.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 shows a perspective view of an instrument incorporating my compensating mechanism;

Fig. 2 shows a front view thereof; and

Fig. 3 shows a modified system of levers to compensate for changes in chart width.

In recording devices in general, the record receiving element, broadly termed a chart herein, may take many forms, but is particularly disclosed herein as a strip chart. The strip chart 1 is fed from a supply roll 2, rotatably supported in any convenient manner in the frame of the recorder, over a guide roll 3 to and around a feed roll 4. This feed roll 4 also serves as a platen for the marking device and is driven in suitable manner in synchronism with the measuring and marking instrumentalities of the instrument, so that as it is rotated, the chart 1 will be moved under a marking device to cooperate therewith. The feed roll 4 is provided on its surface near each end with a series of projections or studs 5 that are adapted to engage in perforations 6 in the chart so that the chart will be moved with the roller.

The perforations of one row are circular and fit the studs 5 without any play, whereas the other row of perforations are formed as slots extending transversely of the chart, so that as the paper changes in width due to humidity or temperature changes to which it is subjected, the chart will continue to lie flat on the feed roll. The perforations 6 that are circular are on the right end of the chart, which in the normal operation of most recording instruments represents the high end of the scale. The recording mechanism may be of any desired type, but is here shown as part of an instrument of the potentiometer type such as that shown in Harrison Patent 1,946,280 dated February 6, 1934.

A helically grooved shaft 7 may be conveniently driven through a gear 8 by a well-known potentiometer driving mechanism, so that the rotations of the shaft 7 are in accordance with the variations in the quantity measured. Obviously, the shaft 7, which is mounted for rotation in the side plates 9 and 10 of the frame in the recording device, may be rotated in response to any of a large variety of measured quantities and by any of a large variety of measuring devices such as the one disclosed in the above mentioned Patent 1,946,280. The spiral shaft 7 operates to position a carriage 11, the position of which is determined by the extent of the rotation of the shaft 7, and, accordingly, its position is a measure of the quantity to which the recording device responds. The carriage 11 has secured thereto, in any suitable manner, a cam follower 12 which is shaped and positioned to ride in a helical groove of the shaft 7. The carriage 11 is provided with integral ears 13 in which the shaft 7 rotates and which support the carriage for sliding movement thereon. The carriage 11 is provided with lugs 14 integral therewith which rest upon a frame member 15 and are slidable thereon. The lugs 14 and ears 13 support the carriage for sliding movement which, as shown in Fig. 1, is in a direction parallel to the axis of rotation of the feed roller 4 and, therefore, transverse to the direction of movement of the chart 1.

A marking device, which is shown herein as a print hammer 16, is supported by the carriage 11 and is operated to make a record upon the chart 1 by pressing, at a point, the ribbon 17 of carbon or inked cloth, or other material capable of producing a record against the surface of the chart 1. Print hammer 16 is an integral part of a tongue which extends through a slot 18 in the carriage 11. This tongue is bent upon itself to form a top plate 19 and is further bent upon itself to form a pair of lugs 20. The lugs 20 are apertured to receive the shaft 21 which is pinned in projections 22 bent up from the carriage 11. Thus, the print hammer 16 is pivoted for oscillation about the shaft 21 by means of its lugs 20.

As shown in Figure 1, a bar member 23, that is pivotally supported in the side plates of the instrument by means of brackets 24, is received between the body of the print hammer 16 and the top plate 19, thereof. The right-hand bracket 24 has an extension 25 on it, by which the bracket may be moved around its pivot carrying the bar member 23 with it. This is for the purpose of moving the print hammer 16 around its pivots 22 into and out of engagement with the ribbon 17. The details of this mechanism form no part of the present invention and are fully described in Harrison Patent 1,946,280.

From the above description, it will be seen that the print hammer is moved to some position over the chart 1 which corresponds to the value of the condition being measured and is then moved into engagement with ribbon 17 to make a record mark on the chart. If the humidity and temperature of the chart are the same as they were when the chart was printed, the recording will be accurate, but if the lateral dimension of the chart has changed due to some ambient condition change, incorrect graduation marks on the chart will be under the print hammer, and an inaccurate record will be made. This inaccuracy will increase directly as the value being recorded decreases, since the chart is held relative to the feed roller by studs 5 and the round perforations 6 on the right or high end of the chart and can move relative to the low or left end of the roll because of the elongated perforations 6 on that edge of the chart. Therefore, in order to make an accurate record on the chart, in spite of its variation in width due to ambient conditions, some means must be provided to compensate for these changes. I have provided such an arrangement consisting of a means for shifting the feed roll 4 axially to move the chart as it changes in width and thereby keep the proper divisions under the print hammer for any given temperature being recorded.

Secured by any suitable means, such as small bolts to plates 26 and 27, is a strip or sheet 28 responsive by dimensional changes to variations in ambient conditions such as humidity or temperature which would effect dimensional changes in the chart. While the strip 28 may be made of any of a large variety of materials, it is preferred to employ a specimen of the material of which the chart is made so that changes in dimensions of the chart will be followed in approximately exact correspondence in changes in the dimensions of strip 28 as ambient conditions change.

The plate 26 is fastened to one side of the instrument by an eccentric screw 29, while the other plate 27 is pivotally attached to the lower end of a lever 30 that is pivoted at 31 and biased in a clockwise direction by a spring 32. In this manner, changes in the length of the strip 28 can produce rotation of the lever 30 around its pivot 31 to shift a link 33 to the right or left in accordance therewith. Attached to the left end of the link 33 is a pin 34 that has pivoted on it two additional links 35 and 36, the former of which has its other end pivoted at 37 to the lower end of a segment 38, and the latter of which has its other end pivoted at 39 to a lever 40. This lever 40 is pivoted at 41 to a support 42 attached to side frame 9 and is provided at its lower end with a pin 43 which is received in a groove 44 of the feed roll shaft 45.

From the above description, it will be seen that any elongation of strip 28 will cause a corresponding movement to the right of link 33 under the bias of spring 32. With the point 37 stationary, the movement of link 33 to the right will move link 35 around its pivot 37 and shift link 36 bodily to the right, thereby moving lever 40 and its pin 43 counter-clockwise around point 41. As this occurs, a spring 46, between side plate 9 and roll 4, will move the feed roll to the right. In a similar manner, a contraction of strip 28 would reverse the above operations and move the links 33 and 36 and roll 4 to the left against the bias of springs 32 and 46. In this manner, for every change in length of strip 28, there is a corresponding shifting of feed roll 4 relative to the shaft 7 upon which the print hammer 16 is mounted and by which it is shifted due to changes in the value of the condition being recorded.

Inasmuch as the chart 1 is fastened against movement at the right side of the feed roll, any change in its width would not affect the position of its graduation lines relative to the print hammer at this point, but the effect of a change in chart width would increase as the print hammer moves to the left. A means to compensate for this movement is therefore provided by progressively shifting the feed roll a larger amount for a given change in chart width as the print hammer moves to the left due to a decrease in the value of the condition being recorded. This compensating means will now be described.

There is attached to the left end of spiral shaft 7 a worm gear 48 which meshes with teeth 49 formed on the upper surface of the segment 38. Therefore, as the spiral shaft is rotated to shift the print hammer 16, the worm 48 will rotate the segment around its pivot 50 and move the pivot pin 37 to either the right or left. The pivot 50 is mounted on support 42 and is so positioned that for a normal amount of humidity, when strip 28 is holding lever 30 in a vertical position as shown in Fig. 2, it will be coaxial with the pin 34. In the drawing, the parts are shown in the relative positions that they would assume when the humidity is normal, and the print hammer is at the mid-position along its path of travel.

The worm 48 is so formed that, as the print hammer is moved up-scale, or to the right, the segment 38 is rotated counter-clockwise and pivot pin 37 moved to the right. The segment 38 will be rotated clockwise and pivot pin 37 moved to the left as the print hammer is moved down-scale. At the limit of its movement up-scale, the print hammer will be over the highest scale mark on the chart, and segment 38 will have been rotated until pivot pin 37 is coaxial with the pivot pin 39. A stop pin 52 is provided on the side of link 35 to prevent the links 35 and 36 from toggling over in a reverse direction upon a subsequent movement of the print hammer to the left. When the pivot pins 37 and 39 are coaxial, it will be apparent that any movement of link 33 due to a change in length of strip 28 will move links 35 and 36 around their respective axes 37 and 39, which are now coaxial, and there will be no resulting axial movement of feed roll 4.

If, on the other hand, the print hammer is at its extreme left-hand position, the pivot pin 37 will also be at its extreme left position as indicated by the dotted lines in Fig. 2. At this time, the parts will be so relatively positioned that, for a given movement of link 33 due to a change in length of strip 28, the link 36 will be shifted a maximum amount, thereby shifting the feed roll 4 a maximum amount relative to the print hammer 16. Proportionate movements of the feed roll 4 will be obtained as the pivot pin 37 is moved toward the left from its position coaxial with pin 39. As each position of pin 37 corresponds to a particular position of the print hammer, the roll 4 will be shifted, for a given dimensional change of strip 28, an amount also dependent upon the position of the print hammer.

The chart 1 is drawn from the feed roll 2, the recording position being spaced at a distance therefrom so that with the proper speed of rotation of the roller 4, a considerable length of time, such, for example, as several hours, will elapse between the time that a particular position of the chart 1 leaves the roll 2 and comes under the print hammer 16. By providing for such a length of time for exposure of the chart to ambient conditions, the material of the chart takes up or assumes a condition which is determined by the ambient conditions then prevailing. The condition of the material of the strip or specimen 28 corresponds to that of the chart in the vicinity of the print hammer 16, since the strip or specimen 28 is continually exposed to ambient conditions. The various levers of the system are so proportioned that for a given dimensional change of the strip 28, the feed roll 4 will move the chart in a corresponding manner. In this manner, the graduation marks on the chart that fall under the print hammer 16 are always dependent both upon the position of the print hammer and the ambient conditions to which the chart is subjected. A combination of these two effects ensures accuracy in the printing of the record upon the chart.

It is frequently necessary to adjust the zero-point of the chart with respect to the print hammer, particularly when a new chart roll is placed in the instrument. A convenient means for effecting this adjustment is provided by the eccentric screw 29 which supports the right end of strip 28. The eccentric screw may be rotated to shift the right end of the strip 28 through a limited extent, and by means of the above-described compensating mechanism, the feed roll 4, having the chart thereon, will also be shifted. In this manner, if there is a slight discrepancy between the zero-point on several charts that may be used on the instrument, they may be compensated for by merely shifting the entire roll.

There is shown in Fig. 3 another embodiment of my compensating mechanism using a slightly different leverage system. The compensating strip 28 in this modification is attached at its left end to the plate 27, which in turn has a rod 53 extending therefrom through the side plate 9. Pivoted at 54 to the end of the rod 53 is a lever 55 which is in turn pivoted on a stationary pin 56 and normally biased in a clockwise direction around pin 56 by a spring 57. The action of the spring 57 pulls the upper end of lever 55 to the right against a movable pin 58 in order to move lever 59 around its pivot 60 against the end of shaft 45 of the feed roll 4. Due to the above-described leverage, any contraction of the strip 28 will pull rod 53 to the right and move lever 55 counterclockwise against the tension of spring 57, thus allowing shaft 45 to be moved to the left by means of a light spring 61 bearing between a collar 62 on the shaft 45 and the side plate 9. In a similar manner, an expansion of the strip 28 will move rod 53 to the left and permit lever 55 to turn clockwise under the bias of spring 57. This will in turn move pin 58 and lever 59 to the right to shift the feed roll 4 and the chart thereon to the right.

In order to compensate the movement of the feed roll for the various positions of the print hammer carriage 11 along the chart, the pin 58 is moved up and down between levers 55 and 59 by means of a link 63 connected thereto and pivotally connected to an arm 64 on the segment 38. As the shaft 7 rotates to move the print hammer along the chart, the segment 38 will be rotated to raise and lower pin 58. The worm 48 is formed in such a manner that as the print hammer is moved to the right, or up-scale, pin 58 will be lowered, and as the print hammer is moved down-scale, pin 58 will be raised. When the print hammer is above the highest division mark on the chart 1, the pin 58 will be positioned directly opposite pivot-point 56 of lever 55 so that any movement of the strip 28 will not be transferred to the shaft 45; and regardless of the length of the strip 28, the roller 4 will remain in the same position. When the print hammer is at the left end of its movement and over the lowest division mark on the chart, pin 58 will be raised to its top position between the levers 55 and 59 so that any movement of strip 28 will give a maximum transverse movement to shaft 45. For corresponding intermediate positions of the print hammer 16 and the pin 58, the strip 28 will give proportionate movements to the shaft 45. Thus, it will be seen that in this form of the invention, the chart is also shifted in accordance with changes in humidity with which it and strip 28 are subjected, and that the movements given to the chart will be proportionate to the position of the print hammer along its path.

From the above description, it will be seen that I have provided a novel and compact mechanism for compensating a recording chart for changes in ambient conditions. This mechanism is simple and is accurate. Due to its few number of parts and the ease with which it can be calibrated, this mechanism is adapted to be placed upon any used instruments of this type and can be incorporated in new instruments to increase their accuracy and eliminate a relatively large error that now exists in recording instruments of this type.

Although I have described my apparatus as being applied to an instrument in which the marking element is a print hammer, it will be obvious that the particular type of marking element is immaterial, inasmuch as the compensating mechanism depends only upon the position of the element along its path, and not upon the type of record that is made.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In combination, a record-making device, means to move said device in response to variations in the condition being recorded, means adapted to support a record receiving chart and means to shift said chart supporting means relative to said device responsive to ambient conditions that result in dimensional changes in said chart, and means to adjust said shifting means in accordance with the position of said device along said chart.

2. In a recording instrument, the combination with a helically threaded shaft, a marking device supported by said shaft, means on said marking device cooperating with the thread on said shaft to shift said marking device along said shaft as the shaft is rotated, a chart carrying member movable under said device whereby a chart carried by said member may receive a record made by said device, auxiliary means subject to a dimensional change by variation in ambient conditions to shift said chart carrying member relative to said device upon changes in said ambient conditions and means operated by said shaft to vary the effect of said auxiliary means in accordance with the position of said device.

3. In a recording instrument, the combination with a marking device, means to move said device in accordance with variations in a condition being measured, a chart carrying member movable relative to said device whereby a chart carried by said member may receive a record made by said device, said chart being subject to dimensional changes in accordance with variations in ambient conditions, means to shift said chart carrying member relative to said device in accordance with variations in said ambient conditions, and means operated by said moving means to modify the action of said shifting means.

4. In a measuring instrument, the combination with a marking device, a chart supporting and feeding means arranged to move a record receiving chart, that is subject to dimensional changes in accordance with variations in ambient conditions, past said device, means to move said device along said chart, resilient means to shift said supporting and feeding means relative to said device, a member subject to dimensional changes similar to those of said chart, means connecting said member to said supporting and feeding means in opposition to said resilient means whereby said supporting and feeding means will be shifted in accordance with dimensional changes of said member, and means to modify the action of said connecting means in accordance with the position of said device along said chart.

5. In an instrument, a movable meter element, a cooperating part, means adapted to move said part relatively to said element in response to movements of a measuring member through mechanism including means adjustable to automatically vary the ratio of a movement of said measuring member to a relative movement of said part and element depending upon the portion of the range of such relative movement which is effective in which said mechanism includes a lever actuated by said measuring member and a parallel lever adapted to effect the relative movement of said part and element, the last mentioned means including a thrust pin between said levers and adjustable in accordance with the position of said element to vary the ratio of movement of one lever and the other.

6. In an instrument, a movable meter element, a cooperating part, means to move said part in response to movements of a measuring member, said means including a first lever movable by said measuring member, a second lever to impart movements to said part, connecting means including a leverage ratio adjusting member between said two levers for varying the leverage of both said levers, and means responsive to the position of said movable element to adjust said connecting means whereby movement of said second lever may be varied for a given movement of said first lever.

7. In combination, a marking device, a member subject to dimensional changes with variations in ambient conditions, a part adapted to support a record receiving chart, means to shift said part whereby the part will be moved relative to the marking device, said means comprising a toggle lever arrangement operated by said member and means to vary the movement of said part by said lever arrangement in accordance with the position of said marking device.

COLEMAN B. MOORE.